Sept. 3, 1963  C. E. ADAMS  3,102,494
ROTARY VANE HYDRAULIC POWER UNIT
Filed Feb. 23, 1961  6 Sheets-Sheet 1

INVENTOR.
CECIL E. ADAMS
BY
OLSON & TREXLER

Sept. 3, 1963                     C. E. ADAMS                        3,102,494
                        ROTARY VANE HYDRAULIC POWER UNIT
Filed Feb. 23, 1961                                           6 Sheets-Sheet 2
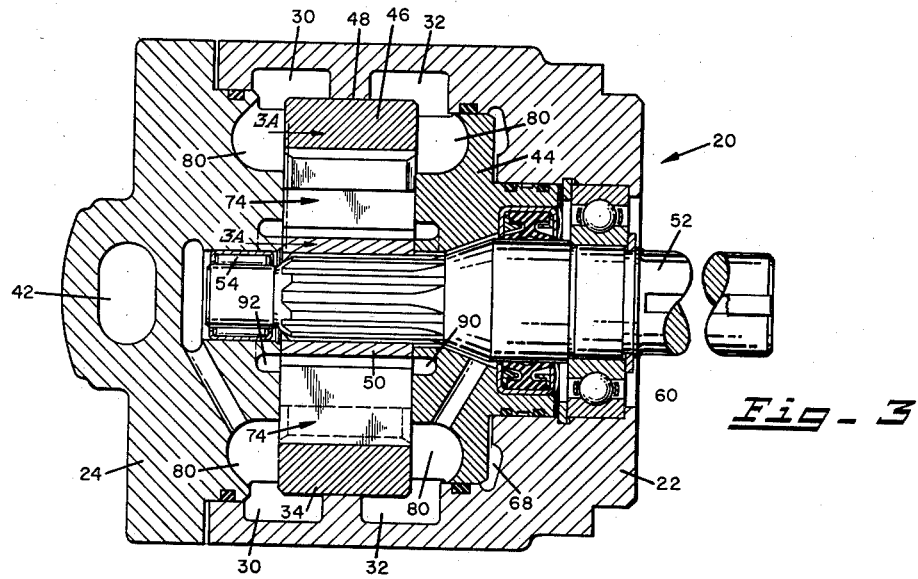
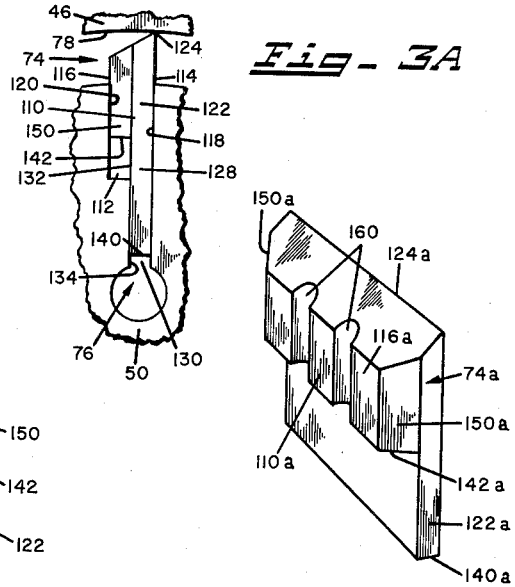
INVENTOR.
CECIL E. ADAMS
BY
OLSON & TREXLER Sept. 3, 1963  C. E. ADAMS  3,102,494
ROTARY VANE HYDRAULIC POWER UNIT
Filed Feb. 23, 1961  6 Sheets-Sheet 3
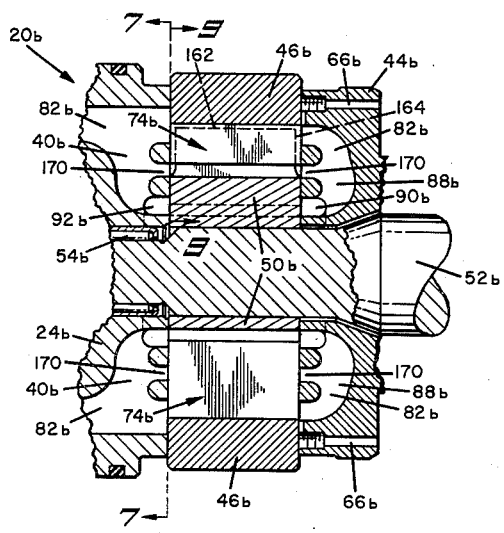
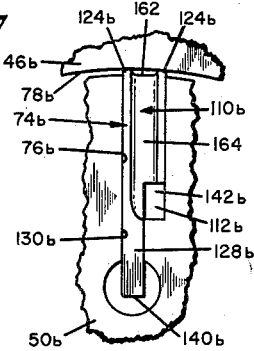
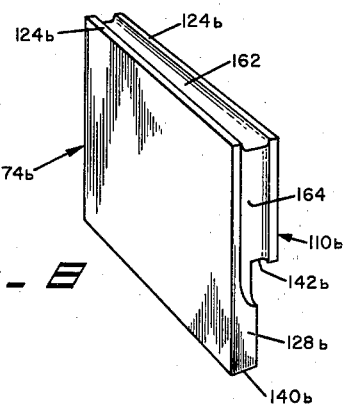
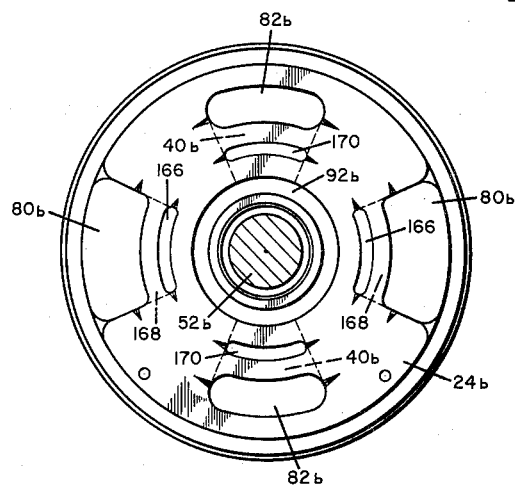
INVENTOR.
CECIL E. ADAMS
BY OLSON & TREXLER Sept. 3, 1963   C. E. ADAMS   3,102,494
ROTARY VANE HYDRAULIC POWER UNIT
Filed Feb. 23, 1961   6 Sheets-Sheet 4

INVENTOR.
CECIL E. ADAMS
BY
OLSON & TREXLER

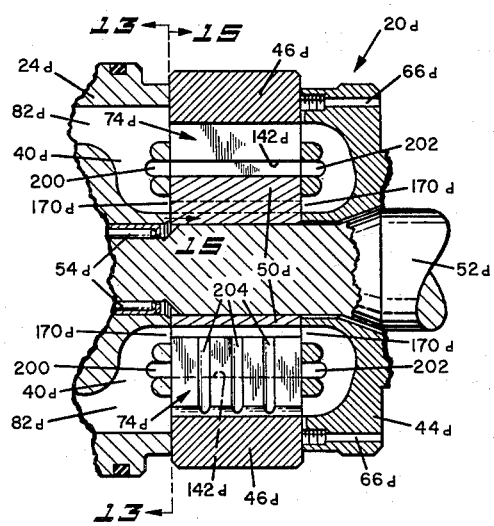
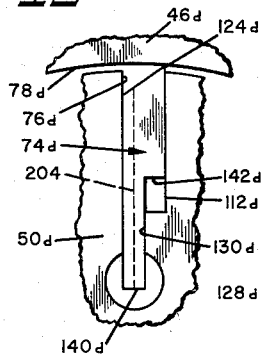
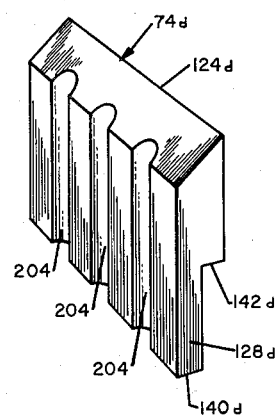
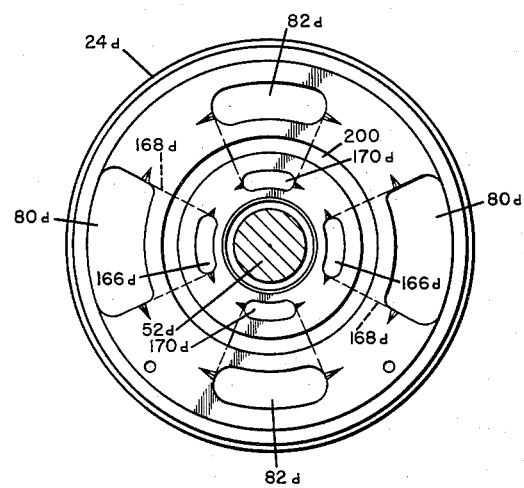

Sept. 3, 1963  C. E. ADAMS  3,102,494
ROTARY VANE HYDRAULIC POWER UNIT
Filed Feb. 23, 1961  6 Sheets-Sheet 6

INVENTOR.
CECIL E. ADAMS
BY OLSON & TREXLER

United States Patent Office 3,102,494
Patented Sept. 3, 1963

3,102,494
ROTARY VANE HYDRAULIC POWER UNIT
Cecil E. Adams, Columbus, Ohio, assignor to American Brake Shoe Company, New York, N.Y., a corporation of Delaware
Filed Feb. 23, 1961, Ser. No. 91,053
9 Claims. (Cl. 103—136)

The present invention relates to rotary vane pumps and motors which will be referred to generally as rotary vane fluid power units.

In general, rotary vane fluid power units comprise a plurality of vanes slidably mounted in a circumferential series of vane slots within a rotor to engage an annular cam track or support surface disposed in encircling relation to the rotor and defining with the rotor one or more fluid spaces through which fluid is circulated as the rotor turns. In a motor, fluid is forced through the fluid spaces between the rotor and the encircling cam surface and coacts with the vanes to turn the rotor. In a pump, the rotor is driven and the vanes operate to pump fluid through the fluid spaces between the rotor and cam surface.

This invention is specifically concerned with rotary vane fluid power units in which the vanes carried by a rotor are cyclically extended to continuously follow an encircling cam surface and are maintained in optimum sealing engagement with the coacting cam surface by the outward forces of fluid pressure from two specifically different sources of fluid pressure acting respectively on two vane actuating surfaces for each vane which are isolated from direct communication with each other.

A rotary vane fluid power unit of this character is disclosed in United States Patent No. 2,832,293, issued April 29, 1956, to C. E. Adams et al. Each vane in a fluid power unit of this character is urged inwardly with respect to a coacting rotor by the force of fluid pressure acting on the radially outer end of the vane. The inward force of fluid pressure acting on the outer end area of each vane is opposed by two forces of fluid pressure acting on two surfaces on each vane which are isolated from direct communication with each other. The two outward forces of fluid pressure on each vane offset the inward force of fluid pressure acting on the outer end of the vane and further provide a controlled differential fluid actuating force on each vane which causes the vane to continuously follow the coacting cam surface and maintain an effective seal between the vane and the cam surface, even during high speed operation of the power unit under high pressures, while at the same time avoiding the application of excessive forces between the cam surface and the individual vane.

One object of the invention is to provide an improved rotary vane, fluid power unit of the above character which affords material economies in the manufacture of the power unit, while at the same time providing enhanced operating efficiency and serviceability over a prolonged service life.

A more specific object is to provide an improved rotary vane, fluid power unit of the character recited having an improved construction which markedly simplifies the rotor within the unit, the housing structure engaging the rotor, and the vanes and coacting structure which effect fluid pressure actuation of the vanes to the end that the cost of the unit is significantly minimized and the operational characteristics and serviceability of the unit are enhanced.

Another object of the invention is to provide a rotary vane, fluid power unit of the character recited which is so constructed that an optimum actuation of the vanes by fluid pressure is achieved by structure on which only flat surfaces well adapted to be economically finished to precision need be finished with great precision, thereby obviating expensive machining operations on the vanes and on the structure coacting with the vanes to support the vanes and effect the desired action of fluid pressure on the vanes.

Other objects and advantages will become apparent from the following description of the exemplary forms of the invention illustrated in the drawings, in which:

FIG. 3 is a longitudinal sectional view of the pump taken with reference to the line 3—3 of FIG. 1;

FIG. 3A is a transverse sectional view on an enlarged scale taken with reference to the line 3A—3A in FIG. 3;

FIG. 4 is a perspective view of a typical vane used in the pump of FIGS. 1 to 3;

FIG. 5 is a perspective view similar to FIG. 4 but showing a modified vane specifically adapted for use in a high speed pump;

FIG. 6 is a longitudinal sectional view of the major components of a pump forming a modified embodiment of the invention;

FIG. 7 is a transverse sectional view of the pump of FIG. 6 taken with reference to the line 7—7 of FIG. 6;

FIG. 8 is a perspective view of a typical vane used in the pump of FIG. 6;

FIG. 9 is a fragmentary end view of the rotor and cam ring of the pump of FIG. 6 taken with reference to the line 9—9 of FIG. 6;

FIG. 12 is a longitudinal sectional view of a pump forming another modified embodiment of the invention;

FIG. 13 is a transverse sectional view of the pump of FIG. 12 taken with reference to the line 13—13 of FIG. 12;

FIG. 14 is a perspective view of a typical vane used in the pump of FIG. 12;

FIG. 15 is a fragmentary end view of the rotor and coacting cam of the pump of FIG. 12 taken with reference to the line 15—15 of FIG. 12;

Figure 1:
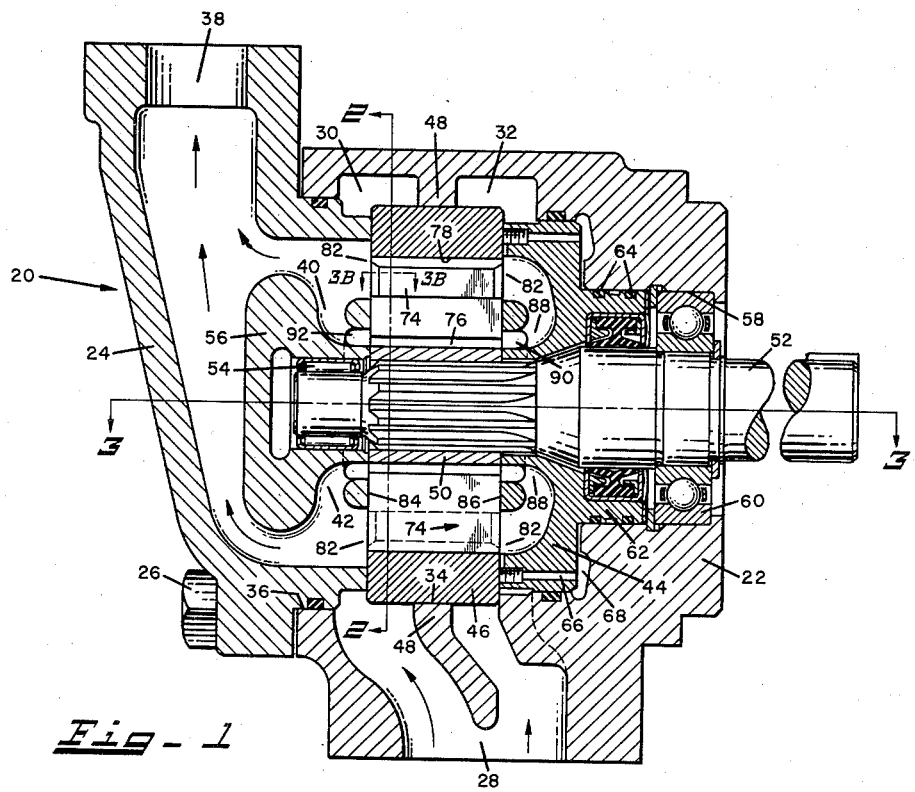
FIGURE 1 is a longitudinal sectional view of a rotary vane hydraulic pump forming one illustrated embodiment of the invention.

Referring to the drawings in greater detail, the rotary vane hydraulic power unit 20, illustrated in FIGS. 1 to 4 and forming the first embodiment of the invention to be described, is designed to function as a pump. However, it will be borne in mind that the invention embodied in this pump is also applicable to a rotary vane fluid motor.

As shown in FIGS. 1 and 3, the pump 20 comprises a housing or casing formed generally in two parts 22, 24 secured together by suitable threaded fastening means 26. The casing part or section 22 is formed as a casting cored and suitably machined to cooperate with coacting components of the pump.

Figure 2:
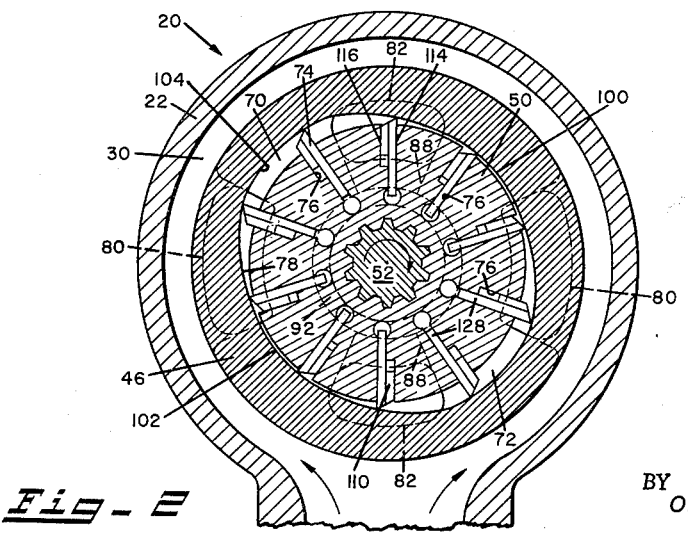
FIG. 2 is a transverse sectional view of the pump taken with reference to the line 2—2 of FIG. 1.

The pump casing section 22 defines a fluid intake port 28 which extends radially inward to communicate with a pair of internal annular grooves or channels 30, 32 formed within the casing section 22, as shown in FIGS. 1 to 3, to encircle a large internal cavity 34 within the casing section which is designed to house coacting pump components to be described. As will presently appear, the channels 30, 32 distribute fluid from the intake port 28 to pumping spaces to be described.

The other casing section 24 fits into a large circular opening 36 defined in one end of the casing section 22 to cover the cavity 34 within the casing section 22. The casing section 24 is also formed as a cored casting and defines a fluid outlet or discharge port 38 which communicates through internal passages 40, 42 with pumping spaces to be described.

The pumping of the fluid is accomplished by working elements disposed within the internal casing cavity 34 and sandwiched between the end of the casing section 24 which protrudes through the opening 34 into the cavity 34 and a disk shaped floating cheek plate 44 disposed within the cavity 34 in opposed spaced relation to the adjacent end of the casing section 24, as shown in FIG. 1.

Thus, the cheek plate 44 and the opposing end of the casing section 24 engage opposite ends of an annular cam ring 46 of generally cylindrical form disposed within the cavity 34, as shown in FIG. 1, and supported radially by an annular rib 48 formed on the casing section 22 between the channels 30, 32. The cam ring 46 encircles a cylindrical rotor 50 splined to a drive shaft 52 journaled within the pump casing.

As shown, FIGS. 1 and 3, one end of the shaft 52 extends through the rotor 50 and is supported by roller bearings 54 mounted within a support 56 formed integrally with the casing section 24 between the passages 40, 42. The shaft 52 projects from the opposite sides of the rotor 50 out through a relatively large opening 58 formed in the casing 22 in concentric relation to the cavity 34. A ball bearing 60 fitted within the opening 58 beyond the floating cheek plate 44 coacts with the shaft 52 to radially support the shaft and hold the shaft against axial displacement.

An axial boss 62 formed on the side of the floating cheek plate 44 opposite from the rotor 50 projects into the adjacent end of the opening 58 and is sealed to the encircling casing structure by sealing rings 64.

The cheek plate 44 is urged axially toward the rotor 50 by the action of fluid pressure directed from fluid discharge ports within the pump through passages 66 within the cheek plate to an annular space 68 formed between the casing section 22 and the outer face of the cheek plate.

The pump 20 illustrated is a "balanced" pump, in that it is designed to effect a balancing or mutual offsetting of the radial forces of fluid pressure applied to the rotor 50. Thus, as shown in FIG. 2, the cam ring 46 is shaped in relation to the cylindrical rotor 50 to define two crescent shaped pumping spaces 70, 72 located generally on diametrically opposite sides of the rotor and isolated from each other. The two pumping spaces 70, 72 thus formed are identical to each other.

Fluid is pumped through each of the spaces 70, 72 by the action of an annular series of circumferentially spaced pumping vanes 74 slidably mounted respectively within a corresponding series of circumferentially spaced vane slots 76 defined within the rotor 50. The outer ends or tips of the vanes 74 oppose and slidably engage a cam surface 78 defined by the cam ring 46 and disposed in encircling relation to the rotor 50.

The cam surface 78 is shaped in relation to the cylindrical periphery of the rotor 50 to define the previously mentioned pumping spaces 70, 72.

In the present instance, the rotor 50 and shaft 52 turn in the clockwise direction with reference to FIG. 2. Each of the pumping spaces 70, 72 communicates with inlet ports 80 and outlet ports 82 circumferentially spaced from each other around the rotor 50. The inlet ports 80 register circumferentially with and communicate directly with the leading ends of the respective spaces 70, 72 with respect to the rotary motion of the vanes 74. In other words, the intake ports 80 communicate with the ends of the spaces 70, 72 into which the vanes 74 enter.

As a matter of fact, two inlet ports 80 are provided for each of the pumping spaces 70, 72 and are located at opposite ends of the rotor 50 within the opposing face of the casing section 24 and the floating cheek plate 44, respectively. Moreover, the intake ports 80 formed within the casing section 24 and cheek plate 44, respectively, communicate directly with the fluid intake channels 30, 32, as shown in FIG. 3.

In this connection, it is noteworthy that the large intake port 28 provides for free, unthrottled flow of fluid into the two annular channels 30, 32 from which fluid flows with equal freedom around opposite ends of the cam ring 46 and through the two pairs of intake ports 80 into the respective pumping spaces 70, 72. The result is to enable the pump to pump at a high volumetric rate without causing cavitation in the pumping spaces 70, 72 or the flow passages leading to these pumping spaces.

The discharge ports 82 which communicate with the pumping spaces 70, 72 are also provided in pairs, two discharge ports 82 being located at opposite ends of the rotor 50 in alinement with each pumping space, as shown in FIG. 1. The discharge ports 82 confronting opposite ends of the rotor 50 are formed in the rotor opposing face 84 of the casing section 24 and in the rotor opposing face 86 of the opposing cheek plate 44. The discharge ports 82 communicating with the respective pumping spaces 70, 72 connect directly with the previously mentioned discharge passages 40, 42 respectively which merge into the pump outlet port 38. The discharge ports 82 formed in the cheek plate 44 communicate through internal passages 88 within the cheek plate with an annular groove or passage 90 formed in the face 86 of the cheek plate in confronting radial alinement with the inner ends of the vane slots 76, as will presently appear. It is also noteworthy that the passages 40, 42 within the casing section 24 communicate with an annular groove or passage 92 formed within the face 84 of the casing section 24 in confronting radial alinement with the inner ends of the vane slots 76. Both of the annular grooves 90, 92 are in continuous communication with the inner ends of all of the vane slots 76 and are continuously connected with the outlet port 38 and with the discharge side of the pumping spaces 70, 72 which therefore serve to maintain a fluid pressure within the inner ends of all the vane slots which is continuously equal to the outlet pressure of the pump. The function of this will be more fully explained presently.

Having reference to FIG. 2, it will be noted that the cam surface 78 is shaped to extend into extremely close proximity to the rotor 50 in two diametrically spaced sealing zones 100, 102 located between the pumping spaces 70, 72. At the inlet end of the pumping space 70, for example, the cam surface 78 progressively recedes from the rotor periphery in the direction of vane movement. In a sealing zone 104 located between the adjacent inlet ports and the adjacent discharge ports 82 the cam surface has a substantially constant radial spacing from the rotor. At the discharge end of the space 70, the cam surface 78 progressively approaches the rotor until it comes again into close proximity to the rotor in the sealing zone 100.

As previously intimated, the individual vanes 74 extend and retract within the vane slots 76 to continuously engage the cam surface 78 as the rotor rotates.

It will be understood that the interspace between the rotor and cam surface 76 which intervenes between two adjacent vanes 74 progressively expands upon movement of the vanes through the intake end of each pumping space and subsequently contract upon movement of the vanes to the discharge end of the pumping space, thus effecting the pumping of fluid through the pumping space.

To effect an efficient pumping action it is necessary to maintain a continuous engagement of the tips of the individual vanes with the cam surface 78. This is especially important when pumping at high pressures. Discontinuities in the engagement of the individual vanes with the cam surface 78 or intermittent separation of the vanes from the cam surface not only is a cause of inefficient pumping, but can cause serious premature wear on the pumping structure. "Skipping" of the vanes over any portion of the cam surface can cause washboarding of the cam surface and other premature and serious damage to the pumping structure. To prevent such "skipping" of the vanes, it is essential that they be urged when moving through the intake ends of the spaces 70, 72 with such force as to maintain engagement of the vanes with the cam surface. This is especially important in pumps which are operated at high speed. However, when the vanes are moving through the discharge end of each pumping space, the vanes are progressively retracted and are not at this time subjected to a substantial pressure differential making tight sealing of the vanes against the cam surface 78 necessary. Hence, the outward force required to maintain each vane in engagement with the cam surface 78 as the vane moves through the intake end of a pumping space may be excessive when applied to the vane as it moves through the discharge end of the pumping space and can cause excessive wear on both the vanes and the coacting structure.

To maintain optimum engagement of the tips of the vanes 74 with the cam surface 78 without subjecting the vane and coacting structure to excessive outward force on the vane, provision has been made for urging each vane outwardly by the force of outlet pressure of the pump applied to an actuating area which is only a fraction of the cross-sectional area of the vane. The basic principles of this mode of actuating the vane slots of a rotor are taught in the previously mentioned United States Patent No. 2,832,293.

The pump 20 provides a most efficient and satisfactory fluid operation of the vanes 74 by means of a pump construction which materially simplifies the structure involved with consequent reduction in manufacturing cost and increase in its serviceability, while at the same time maximizing the functional efficiency of the pump.

As shown in FIGS. 2 and 4, the pump 20 utilizes relatively thick vanes 74 which provide sturdy support to the tips of the vanes and preclude objectionable bending of fully extended vanes even when pumping fluid against an extremely high pressure head.

Thus, as shown in FIGS. 2, 3A and 4, each vane 74 comprises a thick body 110, slidably mounted within a wide portion 112 of the coacting vane slot 76. Each vane body defines two flat, parallel surfaces 114, 116 located on the forward and rear sides respectively of the vane and disposed in contiguous sliding engagement with two flat, parallel surfaces 118, 120 on the rotor 50 defining the wide portion 112 of the slot receiving vane. Each vane 74 extends between opposite ends of the rotor 50 and defines, at opposite ends of the rotor, two parallel side edges 122 which are flush with the corresponding ends of the rotor and which have contiguous sliding engagement with the adjacent confronting faces 84, 86 of the casing section 24 and cheek plate 44, respectively.

The radially outward end of each vane 74 defines a sealing edge 124 located adjacent the forward face surface 114 of the vane and adapted to slidably engage the cam surface 78. From the sealing edge 124 the outer end of each vane is sharply relieved radially inward toward the rear face 116 of the vane.

The thick body portion 110 of each vane extends radially inward from the sealing edge 124 sufficiently to provide, when the vane is in its fully extended position, an extension of the thick vane body into the coacting rotor slot which distributes the forces between the vane and rotor over extensive mutually engaged areas of the vane and rotor surfaces 114, 116 and 118, 120 and sustains the load of fluid pressure on the cantilevering vane without imposing undue strain on either the vane or the rotor structure defining the coacting vane slot.

Each vane 74 also defines an actuating extension 128 integral with the radially inner end of the vane body 110 and extending radially inward with respect to the rotor 50 in flush alinement with the forward face surface 114 of the vane. The actuating extension 128 on each vane has a thickness which is only a fraction of that of the vane body 110 and defines two flat parallel surfaces which slidably engage corresponding surfaces of a relatively narrow portion 130 of the coacting vane slot 76, FIG. 3, which extends radially inward from the wide portion 112 of the slot which receives the vane body 110. Thus, the forward face of the actuating extension 128 on each vane is defined by a radially inward continuation of the forward face surface 114 on the vane body and slidably engages a radially inward continuation of the slot surface 118 which engages the vane surface 114. A rear surface 132 of the actuating extension 128 of each vane slidably engages an opposing coplanar surface 134 coacting with the radially inward portion of the slot surface 118 to define the narrow inner portion 130 of the coacting slot 76. The two parallel side edge surfaces 122 on the body 110 of each vane extend radially inward to the inner end of the actuator extension 128 on the vane.

It will be recalled that the inner end of each vane slot 76 is continuously connected with the outlet of the pump and is continuously subjected to the fluid pressure prevailing at the discharge ends of the pumping spaces 70, 72.

Consequently, the output pressure of the pump which prevails within the inner end of each vane slot 76 acts on the radially inner end of the actuator extension 128 of the coacting vane. This pressure on the actuator extension 128 of the coacting vane continuously urges the vane radially outward in its slot by a force which is a function of the output pressure and the effective transverse sectional area of the actuator extension 128 which confronts the bottom of each vane slot. Each vane actuator extension 128 is designed to have a thickness providing a transverse sectional area of thickness which when subjected to the pump output pressure will urge the vane outwardly with the optimum force necessary to cause the vane to follow the cam surface 78 as the vane enters each of the pumping spaces 70. The actuating area on each vane extension 128 which is exposed continuously to the output pressure is identified in FIG. 3A by the number 140.

The outer end of each vane 76 is continuously exposed to the fluid pressure within the adjacent interspace between the rotor and cam surface 78. As each vane progresses through one of the pumping spaces 70, 72, the fluid pressure acting on the outer end of the vane and tending to urge the vane radially inward increases and reaches the full output pressure of the pump as the vane moves through the discharge end of the pumping space. Since the transverse sectional area of the thick body 110 of each vane exceeds the transverse sectional area of the actuating extension 128 on the vane, the radially inward force of fluid pressure acting on the outer end of the vane builds up and exceeds the outward force of fluid pressure acting on the actuating surface 140 of the vane as the pressure at the outer end of the vane increases. Thus, the inward force of fluid pressure applied to each vane as it moves through the discharge end of a pumping space exceeds the force of fluid pressure applied to the vane surface 140 and serving to force the vane outwardly when it is moving across the intake end of the pumping zone wherein the fluid pressure at the outlet end of the vane is at a relatively low value.

However, even though the inward force of fluid pressure on each vane may exceed the outward force of fluid pressure on the vane surface 140, during certain portions of the rotary movement of the vane continuous engagement of the vane with the cam surface 78 is maintained by the action of fluid pressure on a second actuating surface 142 defined on each vane at the juncture of the thick vane body 110 with the relatively thin actuating extension 128 on the vane. This surface 142 confronts a space defined within the coacting vane slot between the inner end of the thick vane body 110 and the inner end of the wide vane slot portion 112 which receives the thick vane body.

This space within the vane slot which confronts the vane surface 142 is continuously isolated from communication with the bottom of the vane slot by the close sliding fit of the actuating extension 128 within the thin inner portion 134 of the slot.

Figure 3B:
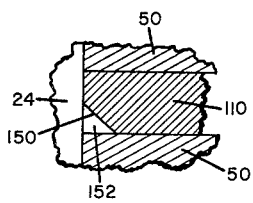
FIG. 3B is a fragmentary sectional view on an enlarged scale taken along the line 3B—3B of FIG. 1.

Each vane 74 is shaped in a very simple manner to provide free flowing communication between the inner end of the wide segment 112 of the coacting vane slot and the interspace between the rotor and cam surface 78 confronting the outer end of the vane. For this purpose, the trailing corners of each vane body 110 adjacent the rear body surface 116 are removed to form deep bevel reliefs 150 which extends along the vane body from the surface 142 to the outer end of the vane, see FIGS. 3A, 3B and 4. As best shown in FIG. 3B, each vane bevel 150 coacts with the rotor 50 and the structure confronting the adjacent end of the rotor to define a sizable radial passage 152 extending from the surface 142 to the outer end of the vane.

Thus, each vane 74 is continuously urged radially outward by two forces of fluid pressure. One force is that of fluid pressure acting on the vane surface 142 and having pressure continuously equal to the fluid pressure acting on the outer end of the vane and tending to force the vane inwardly. The force of fluid pressure acting on the surface 142 varies proportionately to the inward force of fluid pressure on the vane and tends to offset the inward force of fluid pressure on the vane. The continuously high fluid pressure acting on the vane actuating surface 140 is the second fluid force urging the vane outwardly. These two forces of fluid pressure tending to urge each vane radially within its slot relate to each other automatically to maintain optimum engagement of the vane with the cam surface 78.

The vane 74a illustrated in FIG. 5 is designed for use in very high speed pumps. The vane 74a is basically similar to the vane 74 previously described in relation to FIGS. 1 to 4. Components and features of the vane 74a which are similar to corresponding components of the vane 74 are identified with the same reference numbers with the addition of the suffix "a".

Each vane 74a differs from the previously described vane 74 only by the formation in the body 110a of the vane 74a of two semi-cylindrical recesses 160 extending from the actuating surface 142a to the adjacent outer end of the vane and opening rearwardly to the vane surface 116a, as shown in FIG. 5. When the vanes 74a are assembled into coacting vane slots in the manner in which the vanes 74 are assembled into the vane slots 76 described, the semi-cylindrical recess 160 in the vanes 74a form passages providing communication between the vane surfaces 142a and the radially outer ends of the vanes. The communication provided between the vane surfaces 142a and the outer ends of the vanes through the recesses 160 with the surfaces 142 is cumulative with the communication provided through the bevel recesses 150a and facilitates rapid radial displacement of the vanes 74 to maintain engagement of the vanes with the coacting cam surface during high speed operation of the pump.

A pump 20b, forming a modified embodiment of the invention, is illustrated in FIGS. 6 to 9, which show only the basic components of the pump. Component elements of the pump 20b which correspond to previously described components of the pump 20, FIGS. 1 to 4, are identified with the same reference number with the addition of the suffix "b".

As shown in FIGS. 8 and 9, the individual vanes 74b are squared off at their radially outer ends so that each vane defines two sealing edges 124b adapted to engage the encircling cam surface 78b. The two sealing edges 124b are substantially flush with the forward and rear faces, respectively, of the associated vane and are separated by a recess 162 cut into the radially outer end of the vane between the sealing edges, as shown in FIGS. 8 and 9.

Communication between the interspace between the rotor and encircling cam surface 78b at the outer end of each vane 74b and the space within the vane slot adjacent the vane surface 142b is provided by two radial grooves 164 cut into the opposite side edges of each vane and extending inwardly from the outer groove 162 to the adjacent surface 142b, as shown. Thus, fluid can flow radially through the grooves 164 in the opposite side edges of each vane between the outer end of the vane and the bottom of the wide vane slot segment 112b receiving the relatively thick body of the vane.

It will be appreciated with reference to the preceding description that radially outward movement of each vane as it moves through the intake end of a pumping space as described enlarges the space within the vane slot at the inner end of the vane. As a vane moves outwardly fluid is supplied to the relatively thin inner portion 130b of the coacting vane slot from the annular grooves 90b continuously connected to the pump outlet.

As each vane 74b moves outwardly fluid is supplied to the inner end of the wide segment 112b of the vane slot through the vane grooves 164, as described. Additional fluid is supplied to the inner end of the wide segment 112b of each vane slot, as the coacting vane moves outwardly, through ports 166 formed in the rotor confronting faces of the casing section 24b and cheek plate 44b in circumferential alinement with the intake ports 80b, FIG. 7. The ports 166 communicate through passages 168 in the casing segment 24b and cheek plate 44b, respectively, with the corresponding intake ports 80b. The alinement of the ports is such that as a vane 74b moves past one of the intake ports 80b the inner end of the wide portion 112b of the vane slot communicates with the adjacent fluid supply port 116 to receive fluid from the port 166 as the vane moves outwardly. As a vane moves beyond an intake port 80b, the coacting vane slot moves out of communication with the coacting fluid supply ports 166.

As the successive vanes move into the discharge ends of the pumping spaces bringing them into alinement with the discharge ports 82b, the inner ends of the wide segments 112b of the corresponding vanes slots move into alinement with fluid discharge ports 170 formed in the rotor confronting faces of the casing segment 24b and cheek plate 44b in circumferential alinement with the respective discharge ports 82b, as shown in FIGS. 6 and 7. As the vanes move past the respective ports 82b, the vanes move radially inward and discharge fluid from the wide vane slot segments 112b through the ports 170. Fluid is discharged from the inner ends of the narrow vane slot segments 130b into the annular grooves 99b.

Each of the vane slots 76 used in the pump construction of FIGS. 1 to 4 and each of the vane slots 76b used in the pump of FIGS. 6 to 9 has a stepped form in which the outer portion of the slot which receives the coacting vane body is much wider than the inner portion of the vane slot which receives the relatively thin actuating extension on the vane. The stepped form of each of the slots 76, 76b increases the number of machining operations which must be performed on each slot.

Figure 10:
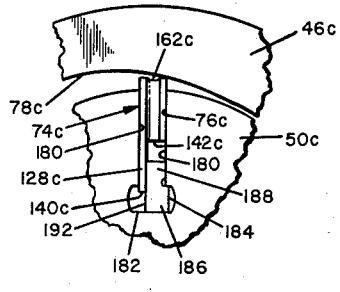
FIG. 10 is a fragmentary sectional view similar to FIG. 9 but illustrating a modified construction which effects a simplification of the vane slots, while at the same time providing for the desired fluid action on the vanes.
Figure 11:
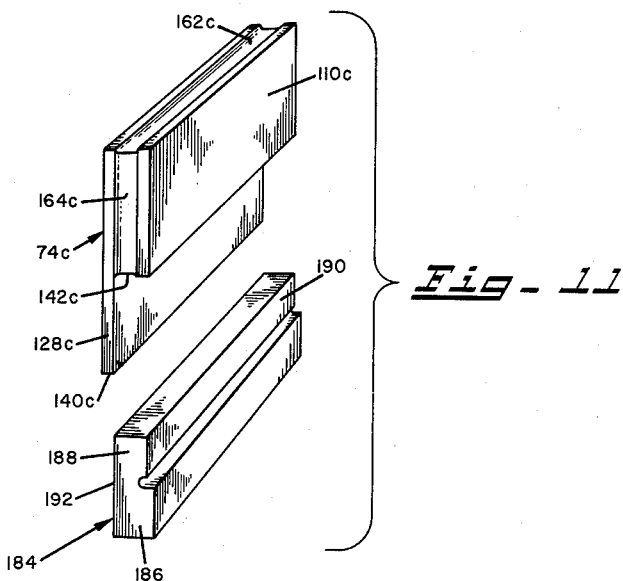
FIG. 11 is an exploded perspective view of the vane and coacting element disposed in each vane slot of the modified pump structure illustrated in FIG. 10.

FIGURES 10 and 11 illustrate another feature of the invention which provides for further simplifying and minimizing manufacturing cost of the structure which serves to support and effect fluid actuation of each vane. Component elements of the pump structure illustrated in FIGS. 10 and 11 which correspond to structural components of the pumps previously described are identified with the same reference numbers with the use of the suffix "c."

The individual vanes 74c used in the pump structure of FIGS. 10 and 11 are generally similar to the vanes 74b used in the pump of FIGS. 6 to 9. The typical vane 74c illustrated in FIGS. 10 and 11 has an actuator extension 128c which is substantially thinner in relation to the thick body 110c of the vane than are the actuator extensions on the vanes 74, 74a and 74b previously described. However, the thickness of the actuator extensions 128c on the vanes 74c is determined by design to provide the optimum outward force of high pressure fluid on the vanes in the same manner that the thickness of the actuator extensions on the previously described vanes is determined by design.

Machining of the slots 76c in the pump structure of FIGS. 10 and 11 is materially simplified by a construction which obviates the necessity for using stepped slots in which different segments of each slot are machined precisely to different widths. Each slot 76c has an extremely simple form and is defined by two flat parallel side surfaces 180 which extend inwardly from the periphery of the rotor 50c to the bottom of the slot which is somewhat enlarged, as shown. However, the enlargement 182 at the bottom of each slot 76c is made by a rough machining operation which need not be carried out with precision.

An inner segment of each slot 76c defined by the flat parallel surfaces 180 is effectively narrowed by insertion in the slot of a rectilinear filler element or slug 184 designed to occupy a stationary position within the inner end of the slot. As shown, the slug 184 used in each slot 76c has an enlarged base 186 designed to fit into the enlargement 182 in the inner end of the coacting slot and hold the slug against radial displacement in the slot.

A rectilinear filler portion 188 of each slug extends from the enlarged base 186 of the slug into the inner end portion of the coacting slot where a flat coplanar surface 190 on one side of the slug portion 188 fits against one of the parallel surfaces 180 defining the slot.

A flat surface 192 formed on the side of the slug 184 opposite from the surface 190 and in parallel relation to the surface 190 slidably engages the inwardly extending actuator extension 128c on the coacting vane 74c, as indicated in FIGS. 10 and 11. The filler portion 188 of the slug 184 has a thickness which provides a close sliding fit of the slug against the vane actuator extension 128c when the slug is disposed in sealing engagement with the opposite side surface 180 of the coacting slot. The effect is to provide for free radial movement of each vane 74c, while at the same time effecting isolation of the actuator surface 140c on each vane from communication with the actuator surface 142c on the vane.

It should be pointed out that the pump components illustrated in FIGS. 10 and 11 are designed to be substituted in place of similar components of the pump structure illustrated in FIGS. 6 and 7. Thus, the inner ends of the slots 76c communicate with the annular grooves 90b and 92b of FIGS. 6 and 7 and are continuously maintained under the output fluid pressure of the pump. The spaces within the slots 76c intervening between the vane actuator surfaces 142c and the slugs 184 are intermittently connected to the ports 166, 170 of FIG. 7 and communicate through the vane grooves 164c with the spaces between the rotor and cam surface 78c at the outer ends of the vanes.

It will be appreciated that each of the filler slugs 184 used in the pump structure of FIGS. 10 and 11 is inherently adapted to be machined economically, since the surfaces to be machined with precision are flat and parallel.

Thus, the two longitudinal surfaces 190 and 192 on opposite sides of each slug are flat and parallel. Opposite ends of the vanes can be finished to have flat parallel surfaces which lie flush with opposite ends of the rotor 50c. The cost of machining the slugs 184 is far outweighed by the advantages gained in the machining of the simplified rotor slots 76c.

The basic elements of a pump 20d forming another modified embodiment of the invention are illustrated in FIGS. 12 to 15. Component elements of the pump 20d similar to components of the pump structure previously described are identified by the same reference numbers with the use of the suffix "d".

The pump 20d is designed to apply the output pressure of the pump to the actuating surfaces 142d on the respective vanes 74d and to apply fluid pressure to the inner actuating surfaces 140d on the respective vanes which is continuously equal to the fluid pressure at the outer ends of the respective vanes.

As shown in FIGS. 12 and 13, two annular grooves 200, 202 are formed in the rotor confronting faces of the casing segment 24d and cheek plate 44d, respectively, in radial alinement with the inner ends of the wide outer segments 112d of the stepped vane slots 76d. The annular grooves 200, 202 continuously communicate with the high pressure outlet passages 40d, 42d and continuously maintain the inner ends of the enlarged segments 112d of the vane slots under the outlet pressure of the pump. This serves to continuously apply the outlet pressure of the pump to the actuating surfaces 142d of all the vanes, as described.

Continuous communication between the inner ends of the relatively narrow segments 130d of the slots 76d and the interspaces between the rotor and cam surface 78d at the outer ends of the respective vanes is provided through three semicircular grooves 204 recessed into the side of each vane opposite from the actuating surface 142d and extending between the inner and outer ends of the vane, as illustrated in FIGS. 14 and 15. The result is to maintain a fluid pressure on the actuating surface 140d of each vane which is equal to the fluid pressure at the outer end of the vane. Fluid ports 166d provided in the rotor confronting faces of the casing section 24d and the floating cheek plate 44d communicate through passages 168d with the intake ports 80d and correspond to the ports 166 of the pump illustrated in FIGS. 6 to 9, previously described. Ports 170d formed in the rotor confronting faces of the casing section 24d and floating cheek plate 44d communicate with the outlet passages 40d, 42d and correspond to the ports 170 of the previously described pump illustrated in FIGS. 6 to 9.

However, the ports 166d and 170d are positioned radially for alinement with the inner ends of the rotor slots 76d. As the rotor 50d turns, the inner ends of the rotor slots 76d intermittently connect with the ports 166d and 170d so that the inner end of each slot receives fluid through a port 166d as the vane in the slot moves past an intake port 80d and discharges fluid through a port 170d as the associated vane moves past a discharge port 82d.

Figure 18:
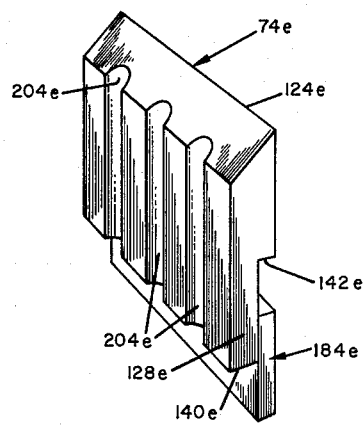
FIG. 18 is a perspective view of the vane and coacting element fitted into each vane slot of the pump structure illustrated in FIG. 16.
Figure 16:
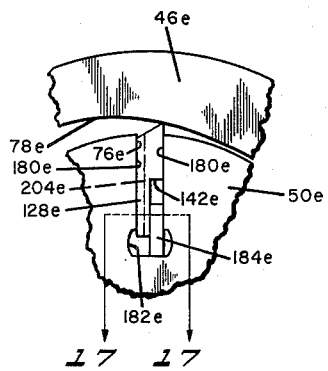
FIG. 16 is a fragmentary sectional view similar to FIG. 15, but showing a modified construction which simplifies each vane slot.
Figure 17:
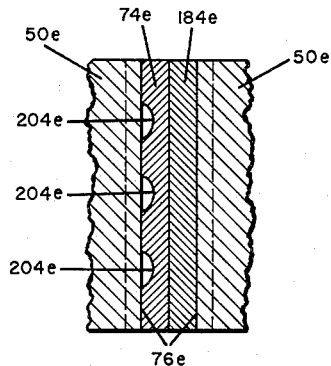
FIG. 17 is a fragmentary sectional view taken with reference to the line 17—17 of FIG. 16.

The vanes 74d incorporated into the pump illustrated in FIGS. 12 to 15 are slidably disposed in stepped vane slots 76d, as shown in FIG. 15. FIGS. 16 to 18 illustrate a modification of the pump of FIGS. 12 to 15 which eliminates the necessity for machining stepped vane slots in the rotor to receive the vanes.

Components of the pump structure illustrated in FIGS. 16 to 18 which correspond to components of the pumps previously described are identified with the same reference numbers with the use of the suffix "e".

The vanes 74e used in the pump structure of FIGS. 16 to 18 are identical to the vanes 74d incorporated into the previously described pumps illustrated in FIGS. 12 to 15. However, the individual vane slots 76e are not stepped to conform to the stepped shape of the vanes 74e and are individually defined by two flat parallel rotor surfaces 180e. As shown, the inner end of each vane slot 76e has an enlargement 182e which is not precisely dimensioned.

A flat rectangular filler slug 184e is fitted into the inner end portion of each vane slot 76e, as shown in FIGS. 16 and 17, to lie flat against one of the slot surfaces 180e and to have flat side engagement with the relatively thin actuating extension 128e on the inner end of the coacting vane. The slug 184e removably positioned in each vane slot 76e, as shown, serves basically the same function as the individual slugs 184 used in the vane slots 76c of the pump structure illustrated in FIGS. 10 and 11 previously described.

It will be appreciated that the present invention is not necessarily limited to use of the particular construction illustrated and described, but includes the use of variants and alternatives within the spirit and scope of the invention as defined by the claims.

The invention is claimed as follows:

1. In a hydraulic power unit, the combination of a rotor, a cam encircling said rotor, said rotor defining a plurality of circumferentially spaced vane slots therein, a plurality of vanes slidably mounted in said respective slots to engage said cam, each of said vanes having a relatively thick outer portion and a relatively thin inner portion, each of said inner and outer vane portions defining two parallel side surface areas, each of said vane slots being shaped to define parallel surface areas slidably engaging the corresponding side surfaces on the relatively thick outer portion of each vane and to define parallel surfaces engaging the corresponding side surfaces on the relatively thin inner portion of the coacting vane, each vane defining at the juncture of the relatively thick outer portion thereof with the relatively thin inner portion thereof a first differential surface area which when subjected to fluid pressure will urge the vane outwardly, the relatively thick outer portion of each vane defining grooves therein which connect said first differential surface area on the vane with the interspace between the rotor and cam adjacent the vane, the inner end of the relatively thin inner portion of each vane defining a second differential surface area which when exposed to fluid under pressure will urge the vane outwardly, and means connecting said second differential surface area on each vane to a source of fluid under a pressure which is continuously at least equal to the highest pressure in the interspace between the rotor and cam.

2. In a hydraulic power unit, the combination of a rotor, a cam encircling said rotor, said rotor defining a plurality of circumferentially spaced vane slots therein, a plurality of vanes slidably mounted in said respective vane slots to engage said cam, each of said vanes comprising a relatively thick outer portion and a relatively thin inner portion, each of said rotor slots being shaped to form a close sliding fit with the relatively thick and the relatively thin portions of the coacting vane, each vane defining at the juncture of the relatively thick outer portion thereof with the relatively thin inner portion thereof a first differential surface area which when subjected to fluid pressure will urge the vane outwardly, the relatively thick outer portion of each vane being recessed relative to the coacting slot between the cam end of the vane and said first differential surface area on the vane to define with the coacting slot free flowing fluid passage space continuously connecting said differential surface area on the vane with the interspace between the rotor and cam adjacent the vane, the inner end of the relatively thin inner portion of each vane defining a second differential surface area which when exposed to fluid under pressure will urge the vane outwardly, and means connecting said second differential surface area on each vane to a source of fluid under pressure which is at least equal to the highest pressure in any of the interspaces between the rotor and cam adjacent said respective vanes.

3. In a hydraulic power unit, the combination of a rotor, a cam encircling said rotor, said rotor defining a plurality of circumferentially spaced vane slots therein, a plurality of vanes slidably mounted in said respective vane slots to engage said cam, each of said vane slots being defined largely by two opposed parallel rotor surfaces, each of said vanes having a relatively thick outer portion defining two parallel side surfaces slidably engaging the opposed rotor surfaces defining the coacting slot, each of said vanes having a relatively thin inner portion defining two parallel side surfaces one of which is a continuation of one of said side surfaces on the relatively thick outer portion of the vane, each of said vanes defining at the juncture of said relatively thick outer portion thereof with said relatively thin inner portion of the vane a first differential surface which when exposed to fluid pressure urges the vane outwardly, a plurality of rectilinear filler elements corresponding to said respective vanes, each of said filler elements being fitted between the relatively thin inner portion of the corresponding vane and an opposing rotor surface to slidably engage the vane and block communication between said differential surface on the vane and the inner end of the vane, the inner end of the relatively thin inner portion of each vane defining a second differential surface which when subject to fluid pressure will urge the vane outwardly, the relatively thick outer portion of each vane being shaped in relation to the coacting rotor slot to define fluid flow channels extending from the cam end of the vane to said first differential surface on the vane to continuously connect said first surface to the interspace between said rotor and cam adjacent the vane, and means continuously connecting said second differential surface on each vane with a source of fluid under a pressure which is at least equal to the highest pressure between the rotor and cam adjacent any of the vanes.

4. In a hydraulic power unit, the combination of a rotor supported for rotation about a predetermined axis, a cam encircling said rotor, said rotor defining a plurality of circumferentially spaced vane slots each of which is largely defined by two opposed parallel rotor surfaces, a plurality of vanes slidably mounted in said respective slots, each of said vanes including a relatively thick outer portion slidably engaging the opposed rotor surfaces defining the coacting slot, each of said vanes including a relatively thin inner portion extending inwardly of said relatively thick outer portion of the vane, each of said vanes defining at the juncture of said relatively thick outer portion with said relatively thin inner portion of the vane a first actuating surface which when exposed to fluid pressure urges the vane outwardly, a plurality of rectilinear filler elements fitted between the relatively thin inner portions of said respective vanes and opposing rotor surfaces of the respective slots to slidably engage the respective vanes and block communication between said actuating surfaces on the vanes and the inner ends of the vanes, each filler element having a length along the axis of the rotor which is coextensive with the corresponding axial length of the coacting vane, each filler element defining at opposite axial ends end surfaces which are substantially flush with the corresponding axial ends of the coacting vane, the inner end of the relatively thin inner portion of each vane defining a second actuating surface which when subjected to fluid pressure will urge the vane outwardly, each vane defining channels therein extending from the cam end of the vane to one of said actuating surfaces on the vane to continuously establish communication between said one actuating surface and the interspace between the rotor and cam adjacent the vane, and means continuously connecting the other differential surface on each vane with a source of fluid under a pressure which is continuously at least equal to the highest pressure in the interspace between the cam and rotor adjacent any of the vanes.

5. In a hydraulic power unit, the combination of a rotor, a cam encircling said rotor, said rotor defining a plurality of circumferentially spaced slots each of which has an outer end opening outwardly through the periphery of the rotor, each slot being defined largely by two opposed parallel rotor surfaces oriented within the rotor so that the slot has an inner end located much closer to the axis of the rotor than is the outer end of the slot, each of said slots defining and including an enlargement at the inner end of the slot, a plurality of vanes disposed in said respective slots, each of said vanes including a relatively thick outer portion slidably engaging both of said rotor surfaces defining the coacting slot, each vane including a relatively thin inner portion extending inwardly from the relatively thick outer portion of the vane, each of said vanes defining at the juncture of said relatively thick outer portion thereof with said relatively thin portion thereof a first actuating surface which when exposed to fluid pressure urges the vane outwardly, a plurality of filler elements fitted in said respective slots in slidable engagement with the relatively thin inner portions of the respective vanes to block direct communication between said first actuating surfaces on the vanes and the inner ends of the respective vanes, each filler element including an enlarged base fitted into said enlargement of the coacting slot to engage the rotor and positively restrict displacement of the filler element within the coacting rotor slot in a direction away from the axis of the rotor, the inner end of the relatively thin inner portion of each vane defining a second actuating surface which when subjected to fluid pressure will urge the vane outwardly, each vane being shaped in relation to the coacting slot to define channels extending from the cam end of the vane to one of said actuating surfaces thereon to continuously connect the latter to the interspace between the cam and rotor adjacent the vane, and means continuously connecting the other of said actuating surfaces on each vane to a source of fluid under a pressure which is at least equal to the highest pressure of fluid within the interspace between the rotor and cam adjacent any of said vanes.

6. In a hydraulic power unit, the combination of a rotor, a cam encircling said rotor, said rotor defining a plurality of circumferentially spaced vane slots opening through the periphery of said rotor toward said cam, a plurality of vanes slidably mounted in said respective vane slots to engage said cam, each of said vanes including a relatively large outer portion and a relatively small inner portion integral with and extending from the outer portion inwardly with respect to the axis of the rotor and having a transverse sectional area which is materially less than the corresponding transverse sectional area of the outer portion of the vane, each vane defining at the juncture of said relatively large outer portion thereof with the relatively small inner portion thereof a first actuating surface oriented so that the force thereon of fluid pressure will urge the vane outwardly, the inner end of said relatively small inner portion of each vane defining a second actuating surface oriented so that the force thereon of fluid pressure will urge the vane outwardly, means carried by said rotor and coacting with each vane to block direct communication between said first and second actuating surfaces thereon, each of said vanes being shaped to define therein a fluid channel extending from the cam end of the vane to said first actuating surface on the vane to continuously apply to said first surface the pressure of fluid within the interspace between the cam and rotor adjacent the vane, and means for applying to said second actuating surface of each vane fluid pressure which is at least equal to the highest pressure in the interspace between the cam and rotor adjacent any of the vanes.

7. In a hydraulic power unit, the combination of a rotor supported for rotation about a predetermined axis, said rotor having a circular periphery and defining two coplanar annular surfaces axially spaced from each other and being located at opposite sides of said periphery in concentric perpendicular relation to the axis of the rotor, a cam encircling said rotor, said rotor defining a plurality of circumferentially spaced vane slots therein extending between said annular surfaces and opening outwardly through the rotor periphery, each of said vane slots being defined largely by two opposed parallel rotor surfaces, a plurality of vanes slidably mounted in said respective slots to engage said cam, each of said vanes having a relatively thick outer portion defining two parallel side surfaces slidably engaging the opposed rotor surfaces defining the coacting slot, each of said vanes having a relatively thin inner portion defining two parallel side surfaces one of which is a continuation of one of said side surfaces on the relatively thick outer portion of the vane, each of said vanes defining at the juncture of said relatively thick outer portion thereof with said relatively thin inner portion of the vane a first differential surface which when subjected to fluid pressure urges the vane outwardly, a plurality of rectilinear filler elements corresponding to said respective vanes, each of said filler elements being coextensive axially with the axial spacing between said annular surfaces on the rotor and defining on opposite axial ends end surfaces which are flush with said respective annular surfaces; said filler elements being positioned in said respective slots so that at least a substantial portion of each filler element, extending the full axial length of the corresponding vane, is disposed between the relatively thin inner portion of the corresponding vane and an opposing one of the rotor surfaces defining the coacting vane slot to slidably engage the vane and block communication between said differential surface on the vane and the inner edge of the vane, said portion of each filler element and said relatively thin inner portion of the coacting vane having a combined thickness which is virtually equal to the thickness of the outer portion of the vane, the inner edge of the relatively thin inner portion of each vane defining a second differential surface which when subject to fluid pressure urges the vane outwardly, one of said differential surfaces on each vane being connected continuously with the interspace between the rotor and cam adjacent the vane, and the other of said differential surfaces on each vane being connected with a source of fluid under a pressure which is continuously at least equal to the highest pressure in the interspace between the cam and rotor adjacent any of the vanes.

8. In a hydraulic power unit, the combination of a rotor supported for rotation about a predetermined axis, said rotor having a circular periphery and defining two coplanar annular surfaces axially spaced from each other and being located at opposite sides of said periphery in concentric perpendicular relation to the axis of the rotor, a cam encircling said rotor, said rotor defining a plurality of circumferentially spaced vane slots therein extending between said annular surfaces and opening outwardly through the rotor periphery, each of said vane slots being defined largely by two opposed parallel rotor surfaces, a plurality of vanes slidably mounted in said respective slots to engage said cam, each of said vanes having a relatively thick outer portion slidably engaging the opposed rotor surfaces defining the coacting slot, each of said vanes having a relatively thin inner portion extending inwardly from the relatively thick outer portion of the vane, each of said vanes defining at the juncture of said relatively thick outer portion thereof with said relatively thin inner portion of the vane a first differential surface which when subjected to fluid pressure urges the vane outwardly, a plurality of filler elements corresponding to said respective vanes, each of said filler elements being formed at least in part by a flat component portion of the filler element which is coextensive axially with the axial spacing between said annular surfaces on the rotor and which defines on opposite axial ends end surfaces that are flush with said respective annular surfaces, said filler elements being positioned in said respective slots so that said flat component portion of each filler element is disposed between the relatively thin inner portion of the corresponding vane and an opposing one of the rotor surfaces defining the coacting vane slot to slidably engage the vane and block communication between said first differential surface on the vane and the inner edge of the vane, the inner edge of the relatively thin inner portion of each vane defining a second differential surface which when subject to fluid pressure urges the vane outwardly, one of said differential surfaces on each vane being connected to the interspace between said cam and rotor adjacent the vane, and the other of said differential surfaces on each vane being connected with a source of fluid under a pressure which is at least equal to the highest pressure in the interspace between the rotor and cam adjacent any of the vanes.

9. In a hydraulic power unit, the combination of a rotor supported for rotation about a predetermined axis, said rotor having a circular periphery and defining two coplanar annular surfaces axially spaced from each other and being located at opposite sides of said periphery in concentric perpendicular relation to the axis of the rotor, a cam encircling said rotor, said rotor defining a plurality of circumferentially spaced vane slots therein extending between said annular surfaces and opening outwardly through the rotor periphery, each of said vane slots being defined largely by two opposed parallel rotor surfaces, a plurality of vanes slidably mounted in said respective slots to engage said cam, each of said vanes having a relatively thick outer portion defining two parallel side surfaces slidably engaging the opposed rotor surfaces defining the coacting slot, each of said vanes having a relatively thin inner portion defining two parallel side surfaces one of which is a continuation of one of said side surfaces on the relatively thick outer portion of the vane, each of said vanes defining at the juncture of said relatively thick outer portion thereof with said relatively thin inner portion of the vane a first differential surface which when subjected to fluid pressure urges the vane outwardly, a plurality of rectilinear filler elements corresponding to said respective vanes, each of said filler elements being formed at least in part by a flat component portion of the filler element which is coextensive axially with the axial spacing between said annular surfaces on the rotor and which defines on opposite axial ends end surfaces that are flush with said respective annular surfaces, said filler elements being positioned in said respective slots so that said flat component portion of each filler element is disposed between the relatively thin inner portion of the corresponding vane and an opposing one of the rotor surfaces defining the coacting vane slot to slidably engage the vane and block communication between said first differential surface on the vane and the inner edge of the vane, said flat component portion of each filler element and said relatively thin inner portion of the coacting vane having a combined thickness which is virtually equal to the thickness of the outer portion of the vane, the inner edge of the relatively thin inner portion of each vane defining a second differential surface which when subjected to fluid pressure urges the vane outwardly, each vane defining a channel therein extending from the cam edge of the vane to one of said differential surfaces on the vane to provide communication between said one differential surface and the interspace between said cam and rotor adjacent the vane, and means connecting the other differential surface on each vane with a source of fluid under a pressure which is at least equal to the highest pressure in the interspace between the rotor and cam adjacent any of the vanes.

References Cited in the file of this patent
UNITED STATES PATENTS

| 2,731,919 | Prendergast | Jan. 24, 1956 |
| 2,832,293 | Adams et al. | Apr. 29, 1958 |
| 2,919,651 | Gardiner | Jan. 5, 1960 |
| 2,967,488 | Gardiner | Jan. 10, 1961 |
| 2,967,489 | Harrington | Jan. 10, 1961 |
| 3,00,324 | Rosaen | Sept. 19, 1961 |